(No Model.)
O. B. PECK.
PROCESS OF SEPARATING PARTICLES OF DIFFERENT DEGREES OF SPECIFIC GRAVITY.
No. 479,453. Patented July 26, 1892.
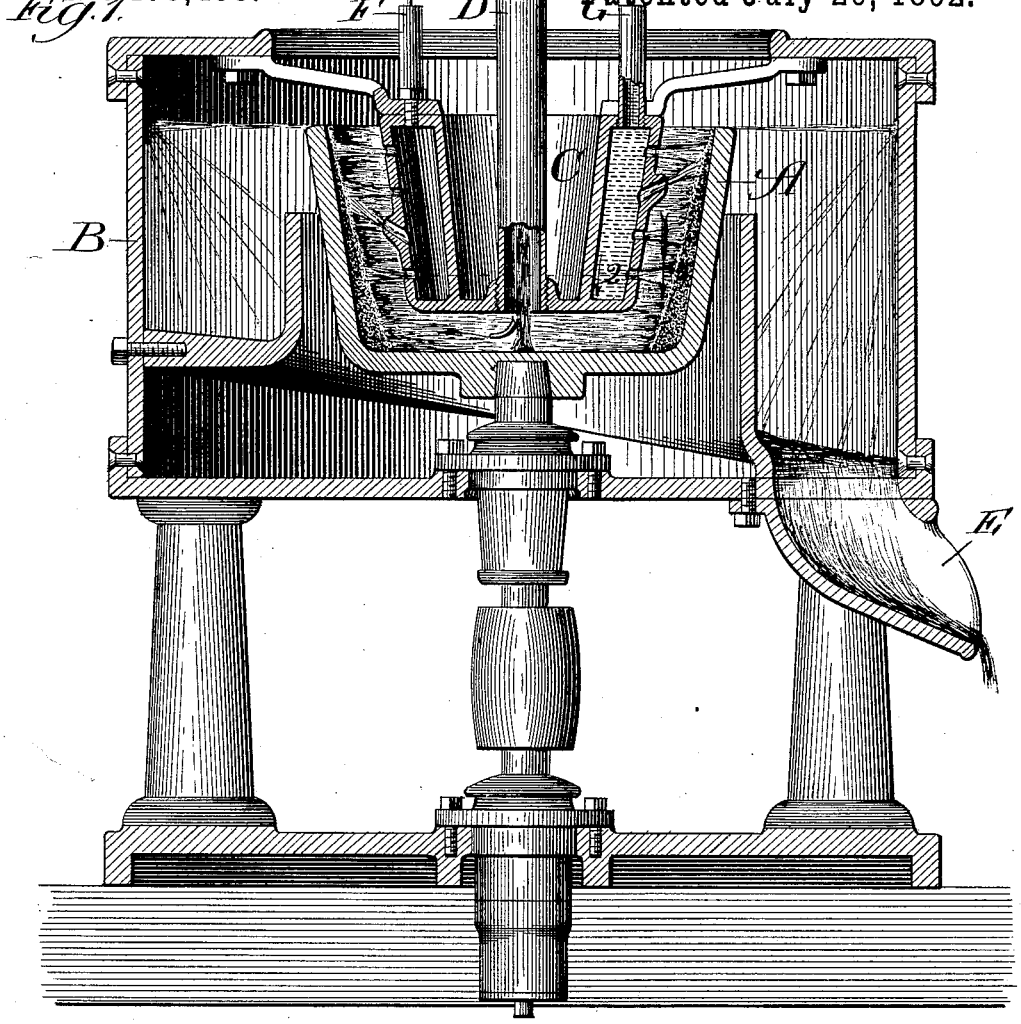
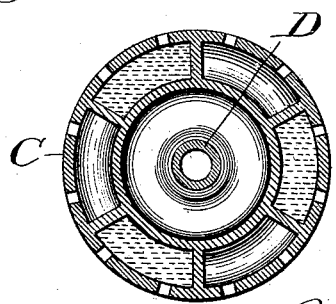
Witnesses:
Inventor,
Orrin B. Peck,

UNITED STATES PATENT OFFICE.

ORRIN B. PECK, OF CHICAGO, ILLINOIS, ASSIGNOR TO MELINDA PECK, OF SAME PLACE.

PROCESS OF SEPARATING PARTICLES OF DIFFERENT DEGREES OF SPECIFIC GRAVITY.

SPECIFICATION forming part of Letters Patent No. 479,453, dated July 26, 1892.

Application filed October 5, 1891. Serial No. 407,809. (No specimens.)

*To all whom it may concern:*

Be it known that I, ORRIN B. PECK, a citizen of the United States, residing at Chicago, Illinois, have invented a certain new and Improved Process of Separating Particles of Different Degrees of Specific Gravity when in a Finely-Divided or Powdered Condition, of which the following is a specification.

The object of my invention is the separation of particles of different degrees of density by subjecting them to the action of centrifugal force, in conjunction with jets or streams of water and air or steam forced against the same to thin or spread the material evenly over the wall of the vessel as it is passing up to the point of delivery; and my invention consists in the process or mode of operation hereinafter described and claimed.

In the drawings, Figure 1 is a vertical transverse section of the apparatus by which I embody or apply my process; and Fig. 2 is a plan of a horizontal section taken in the line 2 of Fig. 1, looking in the direction of the arrow.

In applying my process I employ a revoluble vessel A, mounted on a shaft that may be rotated by any convenient motive power, so as to secure as great an amount of centrifugal force as may be desired. I surround the revoluble treatment-vessel by a curbing B, which may be provided with a top or cover arranged in any convenient manner. I suspend from the top or cover or otherwise support within the revoluble vessel a non-revoluble water and air or steam supplying vessel C. This vessel, as shown in Fig. 2, is made in vertical sections or compartments, so that while water is being forced into one air or steam may be forced into another. A number of holes or perforations are made around the outer wall of the vessel for the escape of the jets or streams of water and air or steam. A material-supply pipe D passes down through the center of the non-revoluble water and air vessel and is preferably screwed into the bottom of the same, so as to open into the bottom of the revoluble treatment-vessel. The material to be treated is introduced, preferably with the water, through this pipe into the bottom of the revoluble vessel, so that it is subjected to the action of centrifugal force, carried out against the sides of the revolving vessel and up the same to the point of discharge over the top into the curbing B, whence it is carried off through a spout E to the desired place. A water-pipe G and an air or steam pipe F enter the water and air vessel, so as to convey water and air or steam into its various compartments. The water and air or steam are carried into this vessel under pressure, so that they will be forced out in jets or streams of sufficient velocity against the material being treated as the same passes up the sides of the revolving vessel. In this way the material is caused to be evenly thinned or spread over the surface of the revolving vessel. Of course it will be obvious that the water and air or steam vessel may be modified in form or simply consist of a pipe or pipes, through which water and air or steam may be introduced and forced or spread against the material under treatment.

The material to be treated is introduced through the pipe D and falls on the bottom of the revolving treatment-vessel, when it is immediately carried by the action of centrifugal force outward to the walls of the vessel and upward along the inside. Water is introduced through the pipe G and air or steam through the pipe F. The water spraying out against the material held against the inner walls of the vessels washes and separates the lighter from the heavier particles. As the material is carried around, it passes the perforations through which the air or steam is passing and by which the flatter or more flaky portions are beaten down and thinned and spread on the walls of the vessel as the mass accumulates. The water thus tends to wash off the lighter particles, which are of a more rounded form, while the air or steam tends to beat down the flat or flaky particles, which largely constitute the valuable portion. When I speak of "air" or "steam," I mean gaseous fluid under pressure, and desire that these terms should be understood in the claims.

What I regard as new, and desire to secure by Letters Patent, is—

1. The process of separating particles of different degrees of specific gravity in a finely-divided or powdered condition, which consists in subjecting them to the action of centrifugal force in a revolving vessel and at the same time forcing streams of water and air or steam against them, substantially as described.

2. In an apparatus for separating particles of different degrees of specific gravity while in a finely-divided or powdered condition, the combination of a revoluble vessel, means for revolving the same, and means for forcing sprays or jets of water and air or steam against the inner walls of the revolving vessel, substantially as described.

ORRIN B. PECK.

Witnesses:
THOMAS A. BANNING,
SAMUEL E. HIBBEN.